L. S. BACHE.
FLOATING BEARING.
APPLICATION FILED MAR. 17, 1914.

1,132,759.

Patented Mar. 23, 1915.

WITNESSES

INVENTOR
Leigh S. Bache,
BY
ATTORNEY

UNITED STATES PATENT OFFICE.

LEIGH S. BACHE, OF BOUNDBROOK, NEW JERSEY, ASSIGNOR TO THE GRAPHITE LUBRICATING COMPANY, OF BOUNDBROOK, NEW JERSEY, A CORPORATION OF NEW JERSEY.

FLOATING BEARING.

1,132,759.  Specification of Letters Patent.  Patented Mar. 23, 1915.

Application filed March 17, 1914. Serial No. 825,356.

*To all whom it may concern:*

Be it known that I, LEIGH S. BACHE, a citizen of the United States, and a resident of Boundbrook, in the county of Somerset and State of New Jersey, have invented certain new and useful Improvements in Floating Bearings, of which the following is a full, clear, and exact description, whereby any one skilled in the art may make and use the same.

The invention relates to bearings and more particularly to the type of bearing known as a "floating bearing".

Floating bearings are common in mechanics and are used either in connection with an internal and external rotary member or with one stationary and one rotary member. They serve to relieve the strains incident to quick variations in speed and light and heavy duty between the shaft and bearing member encircling shaft or other rotary device mounted on the shaft and in a stationary bearing member.

The invention herein defined relates to a form of bearing which may be termed "self-lubricating".

The object of the invention is to provide a bearing which will be of simple form and yet will run smoothly and without undue friction owing to self-lubricating qualities of its interior and exterior surfaces.

A further object is to provide a self-lubricating bearing in which the bearing shell may be made extremely thin and yet retain the lubricant in its interior and exterior surface depressions and may be formed with sufficient strength to withstand ordinary usage to which such a bearing is subjected.

Figure 1:
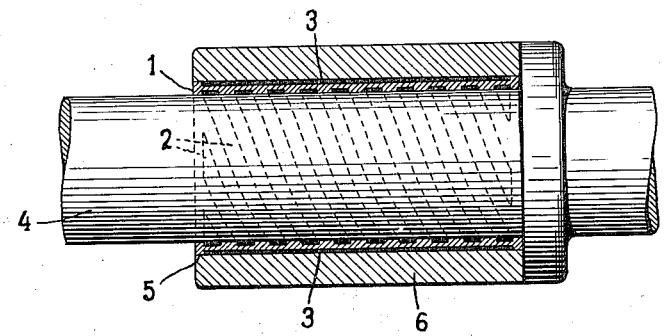
Figure 2:
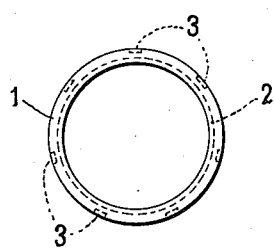
Figure 4:
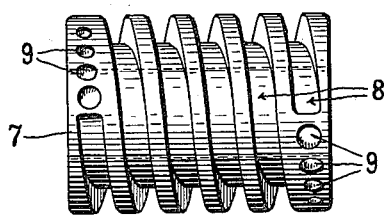
Figure 3:
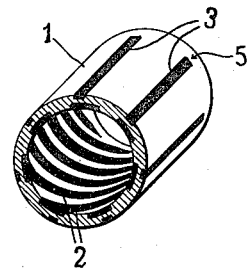
Figure 5:
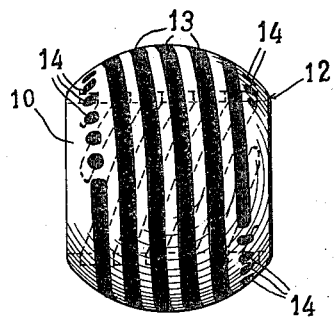
Figure 6:
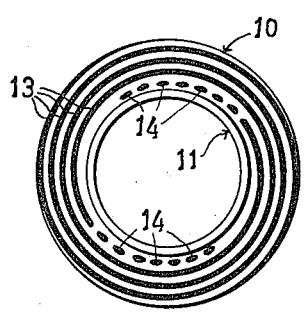

Referring to the drawings: Figure 1 is a sectional view through the exterior bearing box illustrating the floating bearing in place upon a shaft. Fig. 2 is an end view of the bearing. Fig. 3 is a cross sectional view through the bearing. Fig. 4 is a side elevation of a bearing lubricated only as to its exterior. Fig. 5 illustrates an example of a floating bearing of the universal joint type. Fig. 6 is an end view of the bearing illustrated in Fig. 5.

Floating bearings, of necessity, must often be made from comparatively thin material in order to make them available within the limits of proper machine design. Where such bearings have been commonly employed, they have ordinarily consisted of a tubular or sleeve-like form having perforations passing therethrough and with grooves running from the various perforations so that the liquid lubricant, being fed to the shaft within the sleeve, will be carried along the grooves and through the perforations to the exterior of the floating bearing. It has also been a practice to provide perforations through a shell-like or tubular bearing and fill said perforations with a semi-plastic lubricant which will form a suitable lubricating film upon both the members rotating within and outside of the sleeve. Such devices have certain disadvantages. The perforated type soon becomes clogged and in fact, acts as a retainer to dirt and grease which soon causes the bearing to heat and "freeze". In the inserted plug types, the lubricant is often carried free of the shell and the bearing becomes fouled. There is a further disadvantage in the plug type in that the shell is very much weakened by the perforations. In order to secure proper lubrication of the surfaces, the perforations must be arranged in such number and form as to materially weaken the comparatively thin shell.

It is one of the principal objects of the present invention to provide a shell having the lubricating material inserted in its inner and outer surfaces in such manner that the strength of the shell is not materially affected and yet ample lubrication will be provided for all metal parts.

As illustrated in Figs. 1 to 3, a comparatively thin shell 1 is provided interiorly, with spiral grooves 2 and has in its exterior surface longitudinally extending grooves 3. The interior grooves 2 may be of any desired form and arrangement and may have any required pitch. These grooves are filled with a lubricating compound preferably graphite and the arrangement is such that the lubricant will be carried across all of the metal surfaces when the bearing is in use. This will provide ample lubrication between the floating bearing or shell 1 and the shaft 4. The longitudinal grooves 3 may be arranged in any desired number in the outer surface of the shell but do not extend to the ends of the shell so that none of the lubricating material is exposed at the ends of the tube but is confined by thin walls or shoulders 5. The lubricating material arranged in these longitudinal grooves is sufficient to furnish a film of lubricant over the entire exterior surface of the shell 1 and is ample to lubricate the interior surface of the external member 6 within which the bearing is mounted. There is a special reason for employing the longitudinal lubricating grooves 3 in conjunction with the interior grooves 2. The heaviest duty on such a bearing is ordinarily between the bearing shell 1 and the shaft 4 and it is necessary to provide a maximum amount of lubrication between these parts. This is readily effected by utilizing the spiral or helical grooves 2 which extend practically from end to end of the bearing. If the exterior of the bearing were similarly grooved, it would be greatly weakened as of course floating bearings in use are subjected to considerable torsional strain. Ordinarily, the shaft member is one which rotates rapidly and as it is brought up to speed or dropped from high speed to low, there will be unusual strains transmitted to the bearing box unless a floating bearing such as a shell 1 were interposed between the parts. The longitudinal grooves 3 are quite sufficient to provide the necessary lubrication for the exterior surface of the shell inasmuch as they are arranged in sufficient number to provide for the wiping of the lubricant or graphite from the grooves across the intervening metallic surfaces. Their longitudinal arrangement thus gives a complete lubricating effect for the whole surface and yet the intervening metallic portions are of sufficient capacity to withstand the weights and strains. Ordinarily, in forming these bearings, the shells are cast with the interior grooves formed therein and the longitudinal grooves upon the exterior are subsequently milled out. This insures a solid metal shell of the greatest strength. Should the outer grooves be cast, it is obvious that, in thin sleeves, blow holes would appear between the interior and exterior grooves. When formed as above described, there is always a solid body of metal extending from end to end of the bearing between the interior inserts of graphite and the exterior inserts and as there is a bearing surface of metal at the exterior extending from end to end of the bearing, and unbroken lines between the inserted sections of graphite, a bearing of great strength and durability is provided.

In Figs. 4 to 6 are shown floating bearings in which spiral grooves are provided on the exterior of the shell. Fig. 4 illustrates a bearing having an unbroken interior bore while Figs. 5 and 6 illustrate an interior bore having spiral grooves and an exterior provided with spiral grooves for the lubricant. Fig. 4 illustrates the method of attaining full strength in the shell at the same time, providing for ample lubrication. The shell 7 has cast in its exterior surface, grooves 8 which extend nearly to the ends of the shell. Should an attempt be made to carry these grooves completely to the ends of the shell, it is obvious that it would be materially weakened and no such near approach to the ends could be made as would insure proper strength of metal. The ends, of course, must be lubricated and therefore in the place of continuous grooves, the thread-like depressions are terminated some little distance from the ends of the shell and separated depressions 9 are then formed which, in practice, effect the same result as though the grooves were continued. These depressions 9 are, of course, filled with the lubricant as are the grooves 8 and as the shell is rotated, both the grooves and the depressions give off a sufficient film of lubricating material to amply lubricate the intervening metallic surfaces. In Figs. 5 and 6, the same arrangement is employed but in this instance, the application is shown in conjunction with a spheroidal bearing of the floating type. At the greatest diameter, the shell 10 has ample metal between its exterior and the interior bore 11 but at the ends as at 12, there is comparatively little metal between the exterior and interior bore. The spiral threads or grooves 13 are formed upon the exterior of the shell and extend toward the ends until the metal is too thin to make provision for cutting the grooves and in continuation of these grooves, depressions 14 are provided which serve as pockets for holding the lubricant. In this manner, the entire surface of the spheroidal bearing is amply lubricated and yet has ample strength. The interior bore has spiral grooves which retain the lubricating material.

The forms just above described differ materially from the form of Figs. 1 to 3 inasmuch as ample metal is provided in these latter forms (except at their extreme ends) to permit the formation of the grooves for receiving the graphite or other lubricant. Furthermore, the greatest duty upon these bearings occurs at their point of largest diameter.

It is to be understood, of course, that in any of the forms referred to, the grooves are filled with a compound of graphite or similar lubricant which is very firmly pressed into them and then vulcanized to give it a hardness almost equal to that of the metal of the shell and it will be obvious that with the arrangements described, the entire surface of the floating bearing, both as to its interior and exterior will be provided with a film of graphite which will insure easy running of the parts. It is to be understood, of course, that these bearings may be used in conjunction with a liquid lubricant or oil, although it has been found in practice that no oil is actually required. It is apparent that if a thin film of graphite compound is always present upon all the metal surfaces, no other lubricant will be necessary.

Obviously, the bearings may be formed in any desired manner but with the arrangement described, a very thin type of floating bearing shell may be used and this may be cast as to the somewhat complicated interior grooves and readily milled as to the exterior. This gives a shell unbroken from end to end and imperforate and thus it may be made extremely thin and provided with ample lubricating capacity. It is sufficiently strong to resist torsion and other strains and will not become distorted to a degree sufficient to throw off the contained lubricant. Furthermore, any re-action upon the graphite at one side of the shell will not be directly transmitted to the graphite at the opposite side of the shell as there is a continuous shell of metal between the interior and exterior inserts. Where the exterior grooves are arranged longitudinally as in Figs. 1 and 3, a maximum amount of bearing metal for supporting the weights is secured even with very thin bearing shells.

What I claim as my invention and desire to secure by Letters Patent is:

1. A floating bearing comprising a metallic shell having interior grooves and grooves in the exterior of the shell, each set of grooves being completely independent of the other and ununited and terminating within the ends of the shell, and a graphite lubricant filling said grooves.

2. A bearing having a shell and a helical groove extending intermediate the ends of the shell, and isolated pockets formed in continuation of the helices at the ends of the shell and a lubricant filling the grooves and pockets.

3. A bearing having interior grooves and exterior grooves formed in the outer surface of the shell and of helical form and isolated pockets formed in continuation of the helices at the ends of the shell.

4. A bearing having a cylindrical bore and a spheroidal exterior, helical grooves formed in the interior bore and in the exterior spheroidal surface and isolated pockets arranged in continuation of the helical grooves of the exterior surface, said pockets and grooves being filled with a lubricant.

LEIGH S. BACHE.

Witnesses:
S. A. KING,
L. V. ROUSSEAU.